(12) United States Patent
Israel et al.

(10) Patent No.: US 12,266,944 B2
(45) Date of Patent: *Apr. 1, 2025

(54) DEVICE AND METHOD FOR CONTROLLING CONNECTION OF POWER SUPPLY UNITS TO POWER GRID

(71) Applicant: IK Innovations, LLC, Ft. Lauderdale, FL (US)

(72) Inventors: Yaron Israel, Herzliya (IL); Gilad Bartov, Fort Lauderdale, FL (US)

(73) Assignee: IK Innovations, LLC, Ft. Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,082

(22) Filed: Jan. 29, 2024

(65) Prior Publication Data

US 2024/0178674 A1 May 30, 2024

Related U.S. Application Data

(63) Continuation of application No. 18/203,164, filed on May 30, 2023, now Pat. No. 11,936,191, which is a
(Continued)

(51) Int. Cl.
*H02J 3/46* (2006.01)
*H02J 3/32* (2006.01)
*H02J 3/38* (2006.01)

(52) U.S. Cl.
CPC ............... *H02J 3/472* (2020.01); *H02J 3/32* (2013.01); *H02J 3/381* (2013.01); *H02J 2300/24* (2020.01)

(58) Field of Classification Search
CPC .... H02J 3/472; H02J 3/32; H02J 3/381; H02J 2300/24; H02J 9/005; H02M 1/36; H02M 1/0032

See application file for complete search history.

(56) References Cited

U.S. PATENT DOCUMENTS

2009/0045680 A1* 2/2009 Litch .................... F25D 29/00
                                                          62/236
2009/0251002 A1 10/2009 Cohen et al.
(Continued)

FOREIGN PATENT DOCUMENTS

JP    2015208146 A    11/2015
JP    2016148929 A     8/2016
(Continued)

OTHER PUBLICATIONS

PCT International Search Report for International Application No. PCT/IL2022/050315, mailed Jul. 3, 2022, 4pp.
(Continued)

*Primary Examiner* — Ziaul Karim
(74) *Attorney, Agent, or Firm* — The Roy Gross Law Firm, LLC; Roy Gross

(57) ABSTRACT

A power supply assembly is disclosed comprising a power supply unit adapted to provide power to a user's device in accordance with power requirements of the user's device, a power connection control unit and an AC controllable switch, configured to connect and disconnect AC power source from the power supply unit in response to respective control provided by the power connection control unit, wherein the power connection control unit and the AC controllable switch are configured to maintain one of two states without consuming electrical power, wherein the two states of the power connection control unit are set state adapted to switch on the AC controllable switch and unset state adapted to switch off the AC controllable switch and wherein when the power supply assembly is in its unset state it is completely disconnected from the AC power source.

16 Claims, 11 Drawing Sheets

Related U.S. Application Data continuation of application No. PCT/IL2022/050315, filed on Mar. 21, 2022.

(56) References Cited

U.S. PATENT DOCUMENTS

| | | | |
|---|---|---|---|
| 2010/0320846 A1* | 12/2010 | Kim | H02J 9/005 |
| | | | 307/116 |
| 2011/0128153 A1* | 6/2011 | Sims | G06F 1/325 |
| | | | 307/66 |
| 2011/0133655 A1* | 6/2011 | Recker | H05B 47/13 |
| | | | 315/159 |
| 2012/0271468 A1 | 10/2012 | Doljack | |
| 2013/0079943 A1* | 3/2013 | Darden, II | G06F 1/30 |
| | | | 700/297 |
| 2015/0042178 A1 | 2/2015 | Kim | |
| 2015/0115739 A1* | 4/2015 | Kim | H02J 9/005 |
| | | | 307/115 |
| 2016/0218554 A1 | 7/2016 | Hatipoglu et al. | |
| 2018/0026550 A1* | 1/2018 | Dent | H02J 7/35 |
| | | | 363/55 |
| 2018/0034268 A1* | 2/2018 | Motsenbocker | H02J 1/06 |
| 2018/0331551 A1 | 11/2018 | Nguyen et al. | |
| 2019/0013672 A1* | 1/2019 | McDaniel | H02J 7/0068 |
| 2019/0027880 A1* | 1/2019 | Kim | H02J 9/005 |
| 2020/0259336 A1 | 8/2020 | Rao et al. | |
| 2021/0006073 A1* | 1/2021 | Donahue | H02J 3/32 |
| 2021/0211066 A1 | 7/2021 | Vavilpalli et al. | |

FOREIGN PATENT DOCUMENTS

| | | |
|---|---|---|
| KR | 20160053722 A | 5/2016 |
| KR | 20170128748 A | 11/2017 |
| TW | M545396 U | 7/2017 |
| WO | 2015030459 A1 | 3/2015 |

OTHER PUBLICATIONS

PCT Written Opinion for International Application No. PCT/IL2022/050315, mailed Jul. 3, 2022, 5pp.

PCT International Preliminary Report on Patentability for International Application No. PCT/IL2022/050315, issued Sep. 12, 2023, 6pp.

* cited by examiner

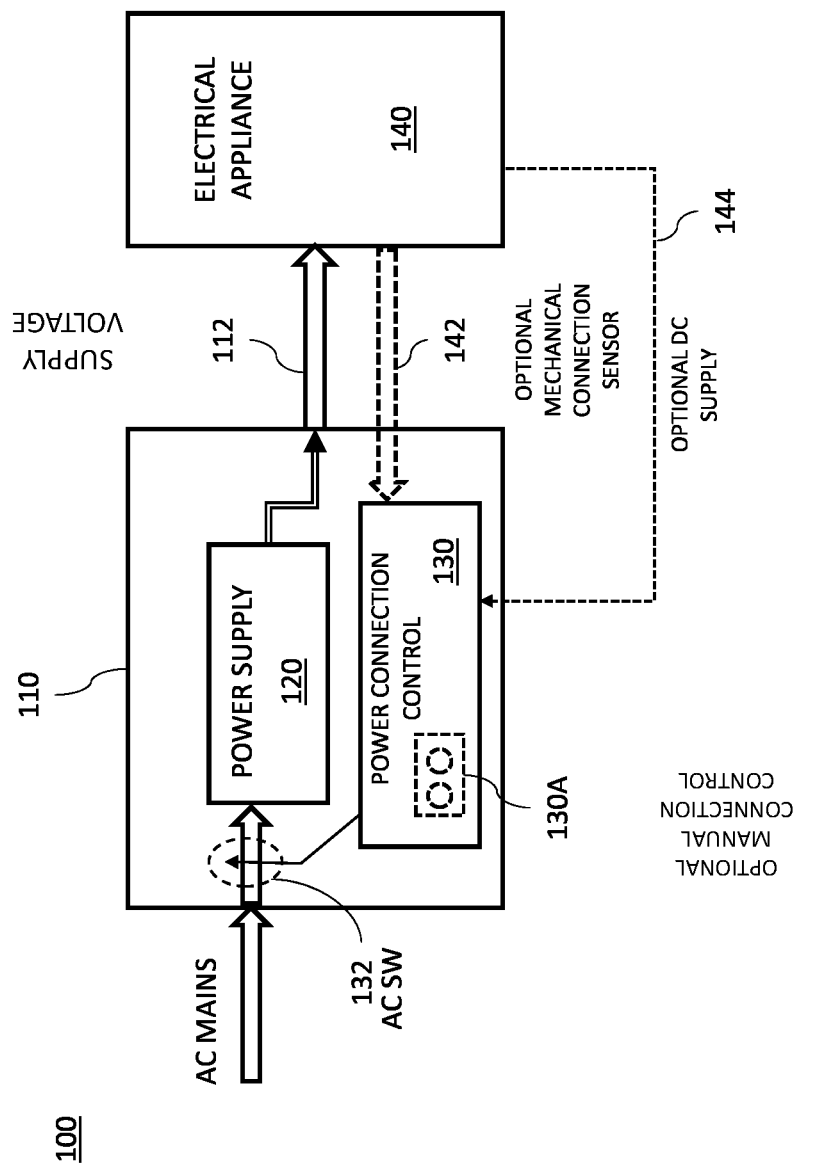

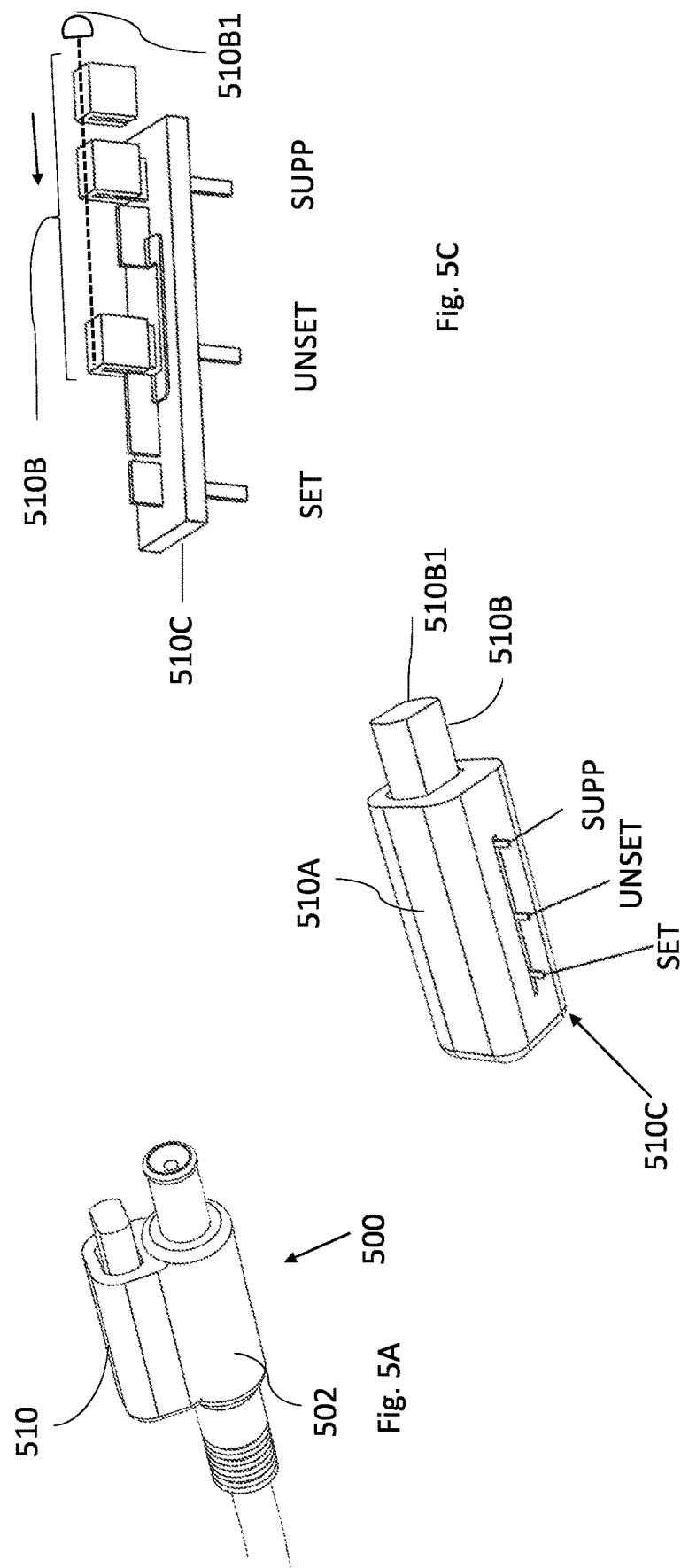

DEVICE AND METHOD FOR CONTROLLING CONNECTION OF POWER SUPPLY UNITS TO POWER GRID

CROSS-REFERENCE TO RELATED APPLICATIONS

This application is a Continuation of U.S. Ser. No. 18/203,164 filed May 30, 2023, which is a Continuation of PCT Patent Application No. PCT/IL2022/050315 having International filing date of Mar. 21, 2022, which claims the benefit of Israeli Patent Application No. 281685, filed Mar. 21, 2021, all of which are hereby incorporated by reference in their entirety.

BACKGROUND OF THE INVENTION

Many electrical devices, computers, appliances, and the like are powered, or charged/re-charged by an external power supply unit that typically comprises an alternating current (AC) voltage adapter such as a transformer, an AC-DC converting unit adapted to convert the AC voltage at the output of the voltage adapter unit to a desired direct current (DC) at a determined voltage level and a determined maximal drawable DC current. Typically, the input power grid, or AC mains, to the AC voltage adapter is left permanently (or at least for long periods of time) connected, thereby maintaining the input stage of the power supply unit under AC power and as a result, a residual current (also known as idle current or standby current) flows through the input stage. This may cause, aside from the undesired electrical power waste (which may sum up to considerable waste if many power supply units are left connected to the AC mains this way), a potential hazard of an accidental fire, specifically when the user of the device is out of the premises.

Many of the prior art circuits in the field that were designed to address this drawback use a mechanical switch near the device that switches the AC, high voltage, electric power directly near the device. Other prior art devices in the field use a plurality of electronic circuits that although might completely cut the idle/standby current from the primary side of the transformer, such circuitry consumes power for its proper operation and thereby such solutions decrease the efficiency of the power supply unit by wasting more energy to drive the different electronic components.

There is a need for a device and a method for providing complete disconnect of the input of the power supply unit from the AC mains when the power supply unit is not in use and is left plugged to the mains socket, enabling connection of the power supply unit to the AC mains when it needs to power or charge a user's device and to enable this functionality with a negligible waste of electrical power, preferably virtually zero power compared to the power required by known electronic or electrical solutions.

SUMMARY OF THE INVENTION

A power supply assembly is disclosed comprising a power supply unit adapted to provide power to a user's device in accordance with power requirements of the user's device, a power connection control unit, and an AC controllable switch, configured to connect and disconnect AC power source from the power supply unit in response to respective control provided by the power connection control unit, wherein the power connection control unit and the AC controllable switch are configured to maintain one of two states without consuming electrical power, wherein the two states of the power connection control unit are set state adapted to switch on the AC controllable switch and unset state adapted to switch off the AC controllable switch and wherein when the power supply assembly is in its unset state it is completely disconnected from the AC power source.

In some embodiments the power supply assembly further comprises a manually operable switch unit adapted to enable a user to set the operational state of the power supply assembly to set state or to unset state.

In some embodiments, the power connection control unit comprises a latching relay controllable to be in set state in response to control signal provided to its set input terminal or in unset state in response to control signal provided to its unset input terminal.

In some embodiments in order to change the state of the latch relay from unset to set or from set to unset the duration of the set control signal or of the unset control signal need not be longer than 5 mS.

In some embodiments in order to change the state of the latch relay from unset to set or from set to unset the energy required to be provided to the set control terminal or to the unset control terminal need not be more than 250 µAh.

In some embodiments the power source for the set control signal and for the unset control signal is independent from the AC power source and from the output power of the power supply unit.

In some embodiments the power source for at least the set control signal is received from the user's device. In some further embodiments the power source for at least the set control signal is received from a battery disposed in the user's device.

In still further embodiments the power source for the unset control signal is received from the power supply unit of the power supply assembly.

In some embodiments the power connection unit is operable by a low voltage and the AC controllable switch is configured to connect and disconnect AC power source of high voltage. In some additional embodiments the power connection unit is operable by a 3V DC power source and the AC controllable switch is configured to connect and disconnect AC power source of 220 VAC.

A method for controlling connection and disconnection of a power supply assembly to AC mains is disclosed, the power supply assembly comprises a power supply unit adapted to provide power to a user's device in accordance with power requirements of the user's device, a power connection control unit and an AC controllable switch configured to connect and disconnect AC power source from the power supply unit in response to respective control provided by the power connection control unit, the method comprising receiving a set control signal at the power connection control unit, setting the AC controllable switch to its set state, thereby enabling connection of AC mains to the power supply unit, receiving an unset control signal at the power connection control unit and setting the AC controllable switch to its unset state, thereby disabling connection of AC mains to the power supply unit.

In some embodiments the set control signal is received from at least one of a manual control command or a physical connection of the power supply assembly to the user's device. In some additional embodiments the unset control signal is received from at least one of a manual control command or a physical disconnection of the power supply assembly from the user's device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 is a schematic block diagram of a power supply assembly comprising a device for controlling the connection and disconnection of a power supply (PS) unit to/from AC mains, according to some embodiments of the present invention;

FIGS. 5A-5F are schematic illustrations of a connector and state selector switch, according to some embodiments of the present invention;

Figure 2B:
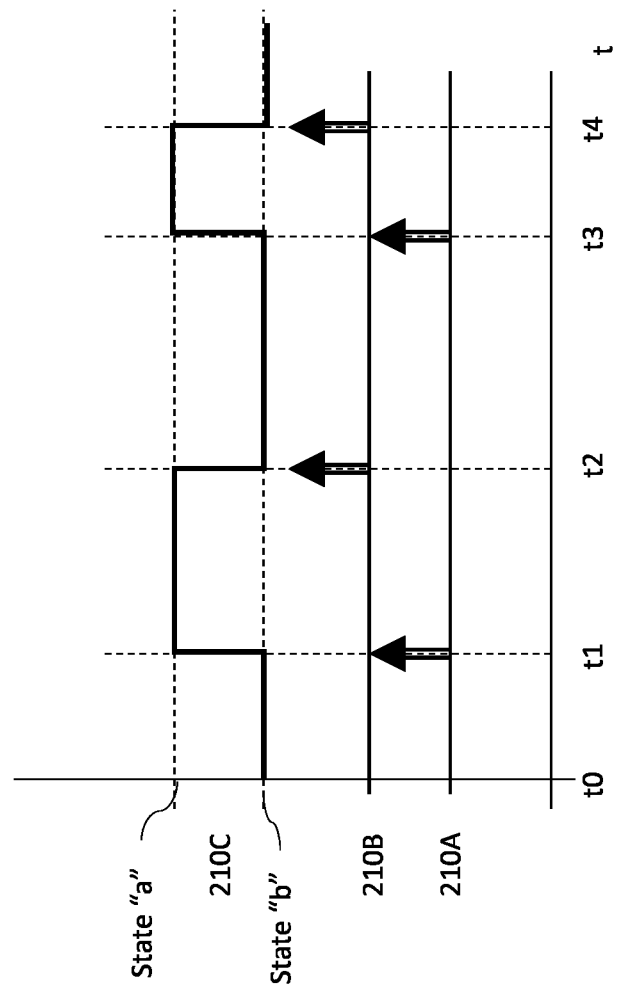
FIGS. 2A and 2B are schematic block diagram illustrations of bi-stable memory device and of time diagram of the operation of the bi-stable memory device, respectively, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference is made to FIG. 1, which is a schematic block diagram of the main units of a power supply assembly 100 comprising connection control unit 130 for controlling the connection and disconnection of a power supply (PS) unit to/from AC mains, according to some embodiments of the present invention. Assembly 100 may comprise a power supply unit 110 with a controlled AC connection and a PS unit 120 adapted to receive the controlled-connection AC power from AC mains socket and to provide DC power at a determined voltage level and a determined maximum available DC current. Assembly 100 further comprises power connection control unit 130, adapted to control the connection and disconnection of AC power to/from PS unit 120. PS unit 120 may be any known power supply device that is configured to convert AC input voltage into supply AC or DC voltage.

The line of AC input voltage to PS unit 120 is provided with AC switch 132, adapted to connect PS unit 120 to the input AC line or to disconnect it from the input AC line. Power connection control (PCC) unit 130 may be configured to control the closing or opening of AC switch 132 and thereby to connect PS unit 120 to the AC mains or to disconnect PS unit 120 from the AC mains. The control of the operation of PCC unit 130 may be done, in some embodiments, using manually operable switch unit 130A, configured to enable changing the states of PCC unit 130 between 'set' and 'unset' states. In some other or additional embodiments, the control of the operation of PCC unit 130 may be done by switching assemblies that may be operated in response to connection or disconnection of power supply assembly 110 to/from user's electrical appliance 140. In some embodiments, the 'set' signal and/or the 'unset' signal may be provided by a connected/disconnected user device, as depicted by a dashed line arrow 142, and explained in detail below.

In some embodiments of the invention, PCC unit 130 may comprise bi-stable memory device that is configured to be controlled to shift from a first position (or state) to a second position (or state) in response to a corresponding control signal(s). According to some embodiments of the invention, the bi-stable memory device may require no electrical energy to maintain either of its two stable positions (or states). According to some embodiments of the invention, the amount of electrical current that is required to cause the bi-stable memory device to change its state may be as low as 50-100 mA. The type of signal required to change the state of the bi-stable memory device from one state to another may be a momentary signal, lasting for only a few mS or less and in some embodiments, the signal need not last longer than 1 mS. The voltage level of the control signals of the bi-stable memory device may be selected to best fit to the range of voltages used in power supply assembly 100. For example, with a typical non-rechargeable coin-type battery of 3V DC having a capacity of 175 mAh, at least a few thousand pulses of changing the bi-stable memory device may be provided, allowing battery service time of more than two years before replacing it, assuming that the associated charging device is connected for charging twice a day, every day.

Figure 2A:
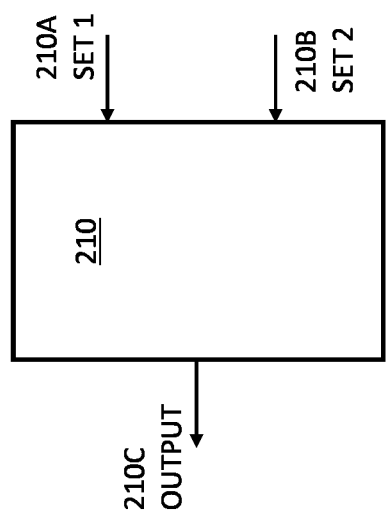

Reference is made now to FIGS. 2A and 2B, which are schematic block diagram illustrations of bi-stable memory device 210 and of time diagram of the operation of bi-stable memory device 210, respectively, according to some embodiments of the invention. Bi-stable memory device 210 may have at least two control inputs namely input set 1 (210A) and input set 2 (210B) and at least one output (210C). Output 210C may be only in one of its two states "a" and "b" and is configured to change states from "a" to "b" and back in response to control signals provided to either input 210A or input 210B. Bi-stable memory device 210 is configured to maintain its state without consuming any electrical energy as long as no reversing control signal is provided. Bi-stable memory device 210 is further configured to respond to a very short control signal (practically a control pulse) which consumes a negligible amount of energy for reversing the state of device 210. The time graph of FIG. 2B depicts the operation of device 210. At time t0 output 210C of device 210 is in state "b". At time t1 control pulse is provided to input 210A and as a result device 210 changes its output state to state "a". At time t2 control pulse is provided to input 210B and as result device 210 changes its output state to state "b", and so forth. It will be noted that the "truth table" of device 210 does not allow for the simultaneous provision of control signals to both inputs 210A and 210B, however in practice many bi-stable memory devices which are commercially available comprise circuitry/mechanism that solves that situation.

Figure 2C:
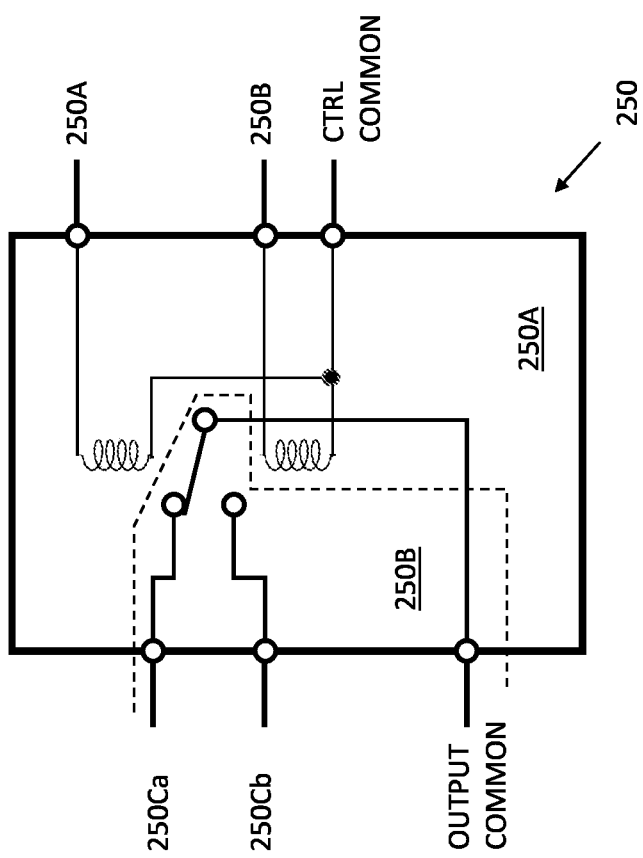
FIG. 2C is a schematic block diagram of a bi-stable memory device, embodied by a latch relay.

Reference is made now to FIG. 2C, which is a schematic block diagram of bi-stable memory and switch device 250, embodied by a latch relay. Bi-stable memory and switch device 250 may comprise two logically different functionalities: state-maintaining functionality 250A and AC switching functionality 250B, which in FIG. 2C are separated by a dashed line. A latch relay embodies the two functionalities in a single device however, it would be apparent to those skilled in the art that in other readily available configurations these functionalities may be embodied in different units. As is known in the art, a latch relay may be controlled to have its relay connecting the output common terminal connected to either terminal 250Ca or to terminal 250Cb, in response to a momentary control signal that may be provided between CTRL common terminal and either one of control terminals 250A or 250B. Bi-stable memory device 250 is configured to operate in accordance with the operation scheme depicted in FIG. 2B. The examples that are described hereinbelow demonstrate several embodiments of the invention using a latch rely as a bi-stable memory device, however, it will be apparent to those skilled in the art that other bi-stable memory devices that operate in accordance with the schemes of FIGS. 2A and 2B are available, such as bi-stable memory devices based on semi-conductor technology. It will further be apparent to those skilled in the art that for specific requirements of power supply assembly, such as power supply assembly 100 of FIG. 1, an appropriate bi-stable memory device may be selected, in which the switching capacity of its output terminals meet the assembly's operational requirements and its control input terminals characteristic meet the assembly's operational voltages.

It will further be apparent to those skilled in the art that latch relays with somewhat different control schemes are available such as a latch relay that in order to reverse its state the polarity of its single control input terminal need to be reversed, as is known in the art. The examples described herein below are made using a latch relay similar to latch relay 250, but many of these examples may be embodied using the latch relay with reversable input control scheme, a semiconductor-based latch relay, and the like, by making the required changes.

Figure 3:
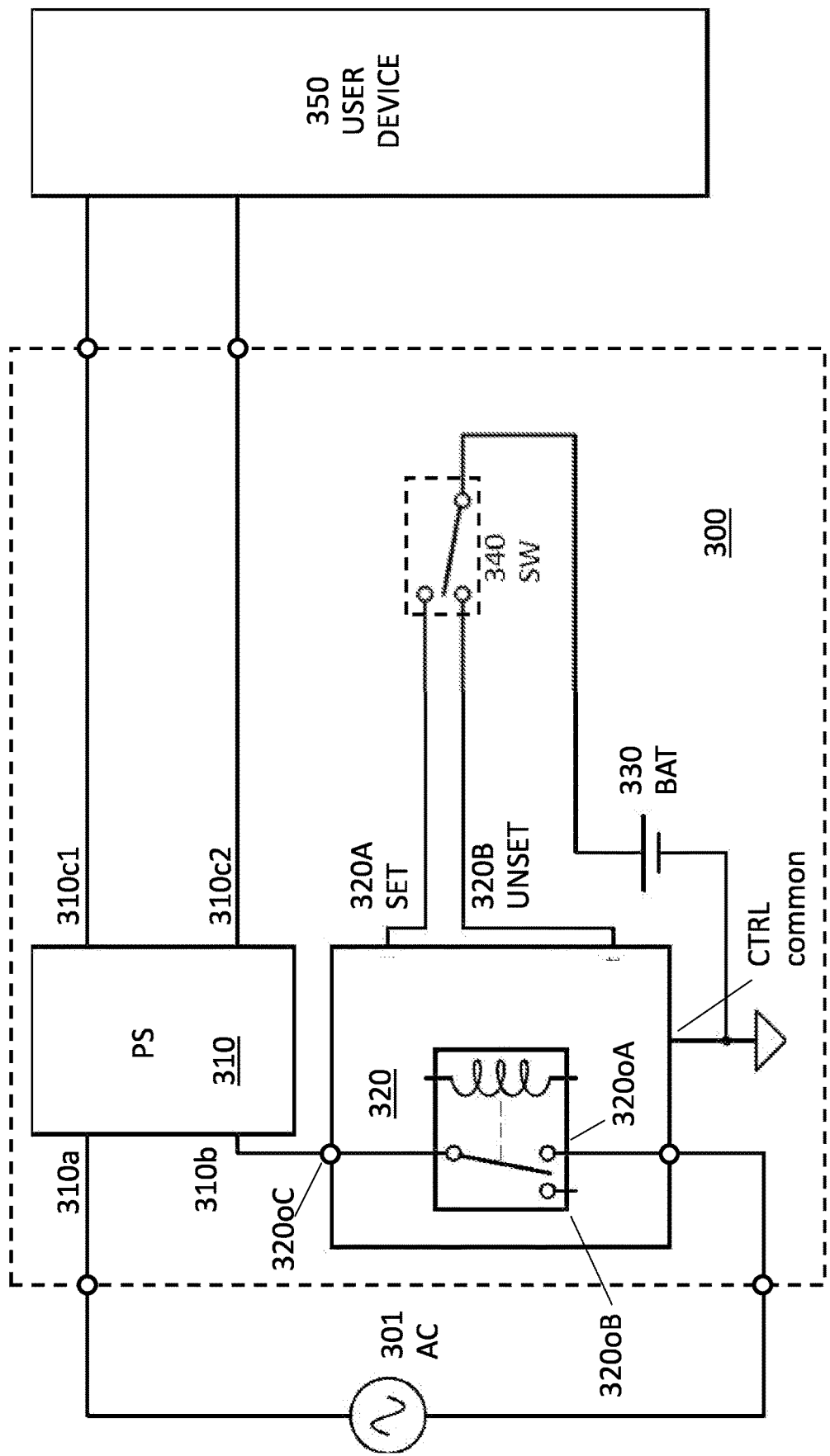
FIG. 3 is a schematic block diagram of power supply assembly, configured and operative according to some embodiments of the present invention.

Reference is made now to FIG. 3, which is a schematic block diagram of power supply assembly 300, configured and operative according to some embodiments of the present invention. Assembly 300 comprises a power supply (PS) unit 310 adapted to convert AC mains input voltage, such AC voltage available at a house's wall AC socket, to DC voltage (or AC voltage in some cases) required to power (and/or charge and/or recharge) user's device 350. Assembly 300 further comprises latch relay 320 configured to control the connecting or disconnecting of AC current to PS 310, in response to control signals provided to its SET input 320A or to its unset input 320B. Latch relay 320 is wired so that when a control signal is provided to its set input 320A an electrical connection is made between the relay's selectable terminal 3200A and its common output terminal 3200C, thereby an electrical circuit is closed and power is provided to PS unit 310. When a control signal is provided to unset input terminal 320B, latch relay 320 sets its output to its B state and thereby disconnects AC voltage from the AC mains and makes assembly 300 completely disconnected from AC power.

The very low electrical power that is required to control the states of latch relay 320 may be received from an internal battery, a rechargeable battery, a rechargeable supercapacitor, a small power supply circuit, such as a 3V 0.5 W AC-DC power supply circuit, and the like, as is known in the art. As seen in FIG. 3, battery 330 may provide power for the set and unset control signals. The selection of the operation mode (whether connecting or disconnecting assembly 300 to/from AC mains) may be done using a single-pole dual throw (SPDT) switch 340, that is configured to enable momentary connection of its central pole to either a first or a second output poles each of them against a return spring, with a central rest position that is not connected to any of the output poles. In case when the latch relay is of the type having a single-reversible input control scheme, the required changes to the circuitry connecting battery 330 to latch relay 320 via a proper switch may be made, as is known in the art.

It will be noted that the energy for setting and unsetting the states of latch relay 320 is stored in and provided by battery 330, which is a local and independent power source. This enables the operation of assembly 300 fully independent of the connection to the external AC main power source. With proper selection of the operational parameters of latch relay 320 and of battery 330, assembly 300 may be controlled through thousands or tenths of thousands of switching cycles on and off. When a recharging unit (not shown) is added, powered by power from PS unit 310, the lifetime of battery 330 may be virtually limitless.

According to some embodiments, a small power supply circuit such as an AC-DC converter (e.g., a 3V 0.5 W AC-DC converter) may be used as a PS for setting and unsetting the states of the latch relay 320. In such configuration, the operation of devices using improved control may be supported while reducing power consumption during an idle state.

Figure 4:
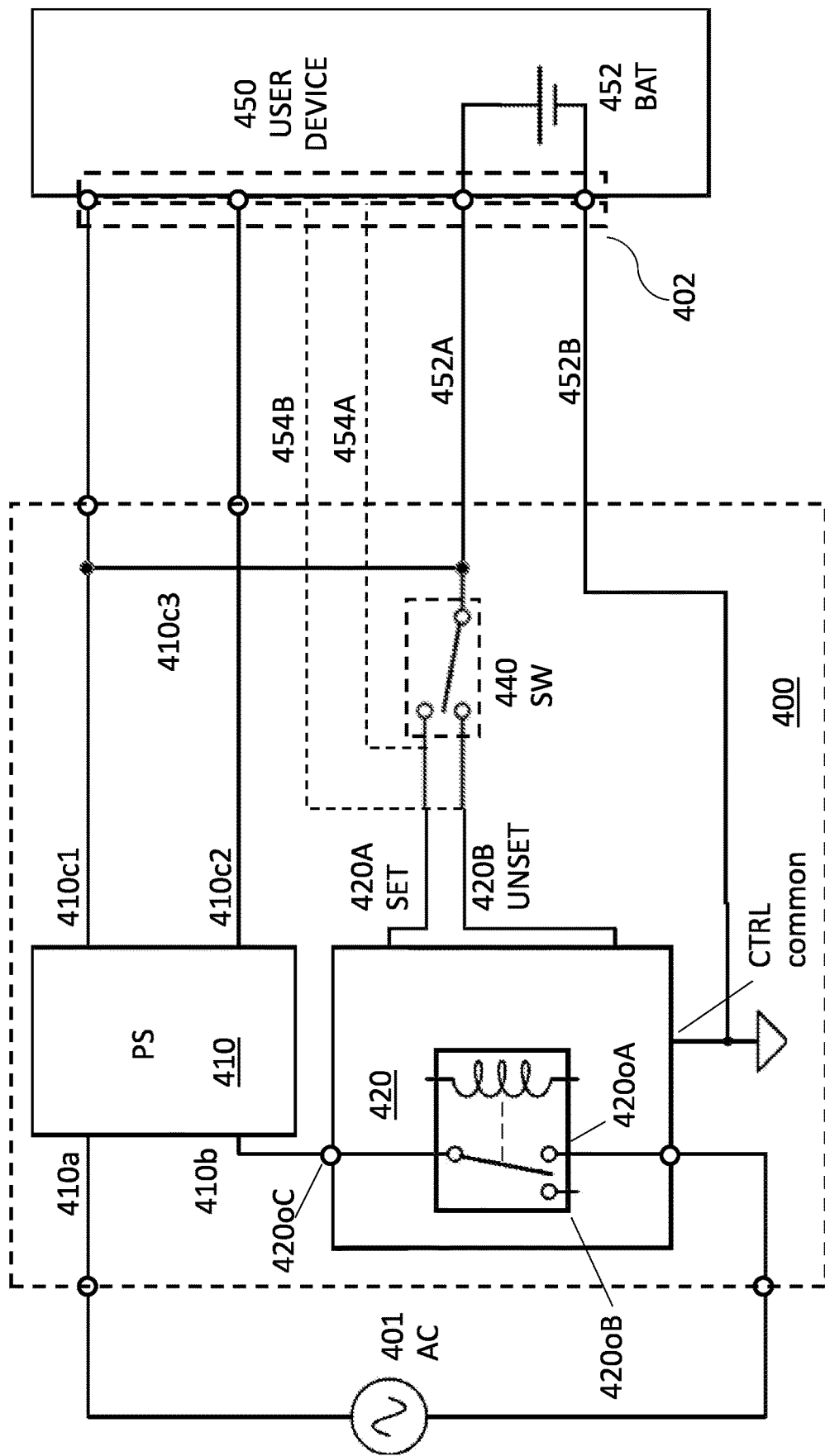
FIG. 4 is a schematic block diagram of power another supply assembly, configured and operative according to some embodiments of the present invention.

Reference is made now to FIG. 4, which is a schematic block diagram of power supply assembly 400, configured and operative according to some embodiments of the present invention. Assembly 400 is similar to assembly 300 described with respect to FIG. 3, with a change according to which the battery for providing the power for the control signals is located inside (or attached to) user's device 450 and not in assembly 400. All other units and elements of assembly 400 may be configured, connected and operative similar to the respective units and elements of assembly 300. Assembly 400 may be connected to user's device 450 through at least four wires (or at least three wires where a common line can be used both for providing power and for enabling battery connection), two for providing the supply voltage, and two for providing DC power from battery 452 of user's device 450 to assembly 400. In some embodiments assembly 400 may be connected to user's device 450 via dedicated connector 402. The operation of assembly 400 may begin by manually connecting assembly 400 to user's device 450, optionally by connector 402. At this stage latch relay is in its unset state and assembly 400 is not connected to AC mains. Once assembly 400 has been manually connected to user's device 450, battery 452 of user's device 450 (which is external to assembly 400) provides power to the central pole of switch 440, enabling providing set signal to latch relay 420. Once assembly 400 has been set to its operational state, it may provide power to user's device 450. Setting assembly 400 to unset state may be done, when assembly 400 is still connected to user's device 450, by the power provided by battery 452. Setting assembly 400 to unset state may be done also when assembly 400 has already been disconnected from user's device 450, relying on the power provided by PS unit 410 via line 410*c*3 which is powered as long as latch relay 420 is in its 'set' state.

In some embodiments, the control of the operational states of assembly 400 (set or unset) may be done directly from user's device 450, provided that user's device 450 is configured to provide 'set' and 'unset' control signals adapted to operate latch relay 420. In such embodiments the lines 452A and 452B are not required and lines 454A and 454B may be used to allow providing of 'set' and 'unset' signals, respectively directly from user's device. The mechanism in user's device 450 that controls 'set' and 'unset' control signals should comply with the operational scheme of latch relay 420. In this embodiment the switching of assembly 400 to either 'set' or 'unset' states must be done when assembly 400 is connected to user's device 450.

It would be apparent to those skilled in the art that certain other combinations of the wiring of the control switch and/or of the battery, and/or of an external battery (e.g. that is associated with the user's device) may be used in accordance with the scope of embodiments of the invention, for example, to provide certain different operational schemes, either manually or automatically operated.

Figure 5E:
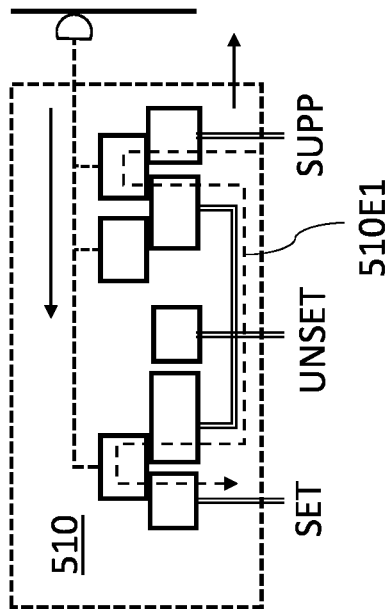

In some embodiments, the connection of a power supply assembly, such as assembly 300 or 400, to user's device, such as user's device 350 or 450, may be done using a dedicated connector assembly, which may comprise, for example, a male and mating female parts of the connector. The two parts of the connector may be designed to connect the supply power from the power supply assembly (e.g. power supply assembly 300 or 400) to the user's device and optionally to provide wiring to enable connection of battery associated with the user's device. The two parts of the connector may further be designed, according to some embodiments of the invention, to also initiate momentary 'set' control signal upon completion of the insertion of the external part of the connector to its mating connector part at the user's device, and a momentary 'unset' control signal upon pulling the connectors part apart, thus performing toggle-like operation or operating according to 'hysteresis' profile, that is—an operational profile in which the state of a system depends on its history. Reference is made now to FIGS. 5A-5F, which are schematic illustrations of connector 500 and state selector switch 510, according to some embodiments of the present invention. Connector 500 may comprise two main parts, power connector part 502, that is adapted to connect, electrically and mechanically, with a compatible socket (not shown) that may be installed, or may be part of the user's device, and a state selector switch part 510, which may be connected, and or may be mechanically part of power connector part 502, so that they move together, as shown in FIG. 5A. State selector switch (SSS) part 510 is configured to make momentary electrical connections between several internal connection pads so as to provide momentary 'set' or 'unset' control signals, as explained with regard to FIGS. 5B-5F hereinbelow. SSS 510 comprises three main parts: an external housing 510A, an internal moving set of conductive pads 510B and an internal stationary set of conductive pads 510C.

Figure 5D:
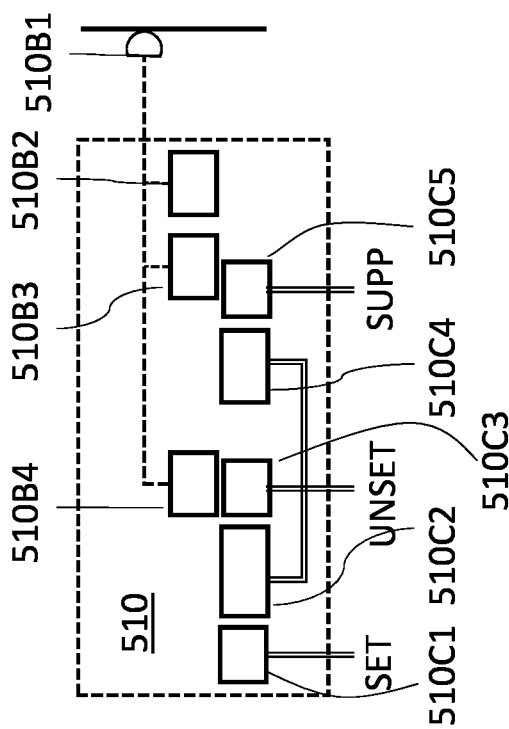
Figure 5F:
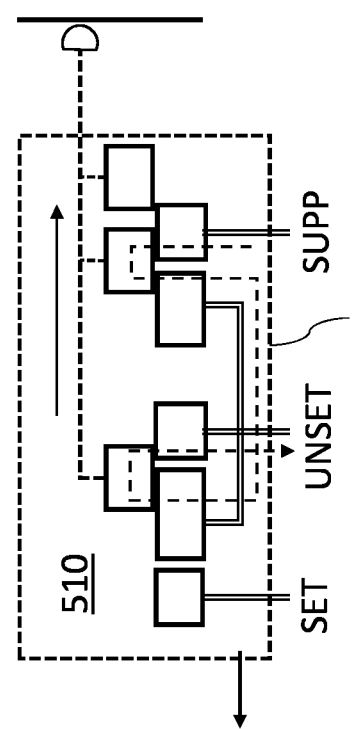

Internal moving set 510B is adapted to move with respect to internal stationary set 510C in response to mechanical force pressing against tip 510B1, which is configured to begin moving when connector 500 begin insertion into a matching socket made in a user's device. Internal moving set 510B comprises a return spring (not shown) adapted to push internal set 510B when the external force exerted on tip 510B1 is released. The operation of SSS 510 is explained in FIGS. 5C-5F. FIG. 5C depicts the relative position of moving set 510B with respect to stationary set 510C in the non-pressed position. In FIGS. 5D-5F moving set 510B and stationary set 510C is shown in a schematic view to provide enhanced clarity. Moving set 510B comprises pads 510B2, 510B3, and 510B4 which are connected mechanically to tip 510B1 so as to be moved together but are electrically separated from each other. Stationary set 510C comprises conductive pads 510C1 to which the 'set' output terminal is connected, pads 510C2 and 510C4 which are connected electrically to each other, pad 510C3 to which the 'unset' output terminal is connected and pad 510C5 to which the 'supply' input terminal is connected, adapted to provide control voltage. The reference numbers used in FIG. 5D will be repeated for FIGS. 5E and 5F as used in FIG. 5D but they are not presented to not obscure the drawings.

SSS 510 is shown in FIG. 5D in its unpressed position, where tip 510B1 already touches a side case of a user's device. FIG. 5E depicts SSS 510 that was moved towards a user's device while insertion of connector 502 into a matching socket made in the user's device, tip 510B1 is pressed by the user's device case and causes moving set 510B to move to the left side of the page. When approaching the end of the insertion of connector 502, moving set 510B reaches a momentary position that is close to its final position with respect to stationary set 510C. At this momentary position, a series of connection bridges is formed allowing flow of control voltage from supply terminal pad 510C5, via pads 510B2, 510C4, 510B4, 510C2, and 510C1 towards 'set' output terminal, as depicted by the dashed line 510E1 in FIG. 5E. When moving set 510B reaches its final position, which is associated with connector 500 is fully inserted into the user's device socket, the series of connection bridges described above is broken and no power is provided to either 'set' output terminal 510C1 or to 'unset' terminal 510C3.

FIG. 5F depicts a momentary position of moving set 510B with respect to stationary set 510C during an operation of withdrawing of connector 502 from its socket. Due to the released mechanical force exerted on tip 510B1, moving set 510B is pushed to the right side of the page (for example by a return spring) and at a certain position continuous electrical path is formed between the supply terminal 510C5 to the 'unset' terminal 510C3, via pads 510B3, 510C4, 510C2 and 510B4, thereby providing a momentary 'unset' signal, as depicted by dashed line 510F1.

In some embodiments, connector 500 may be modified to allow wireless charging by substituting connector part 502 with a wireless charging unit that once a user device is placed on top of it or attached to it, will cause the state selector switch to be pressed, thereby to energize the charging unit.

Figure 5G:
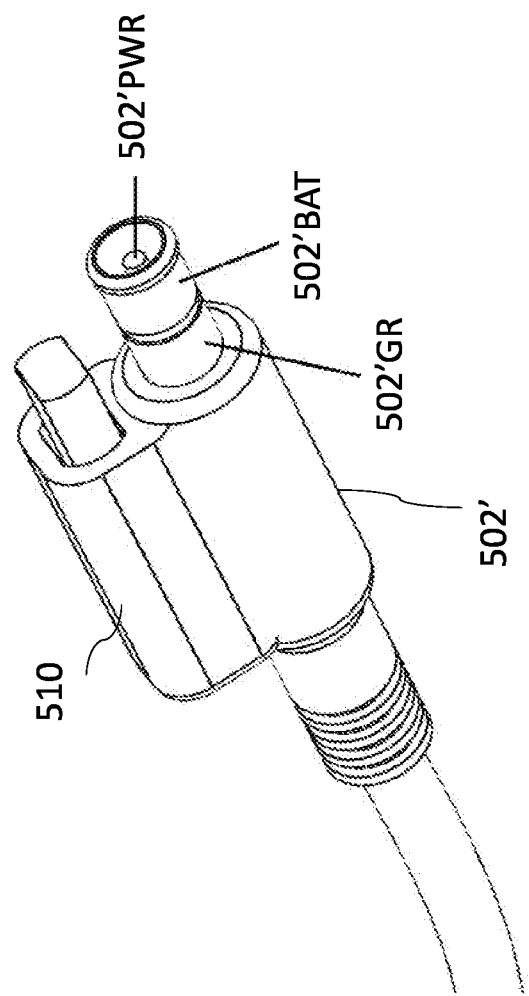
FIG. 5G is a schematic 3D illustration of a connector adapted to provide power from a user's device, according to embodiments of the present invention.

It would be apparent to those skilled in the art that connector 500 may be modified to allow providing of control power from permanent control voltage source in a user's device, such as an internal battery of the user's device, by adding at least one connection to connector 502, as is depicted by connector 502' of FIG. 5G to which reference is now made. Connector 502' comprises central pit 502'PWR for providing power to a user's device, a circumference first ring 502'BAT for providing battery power from a user's device to a power supply assembly such as power supply assembly 300 or 400. Connector 502' further comprises a second circumference ring 502'GR for providing common lead of the power supply assembly to the user's device.

Figure 5H:
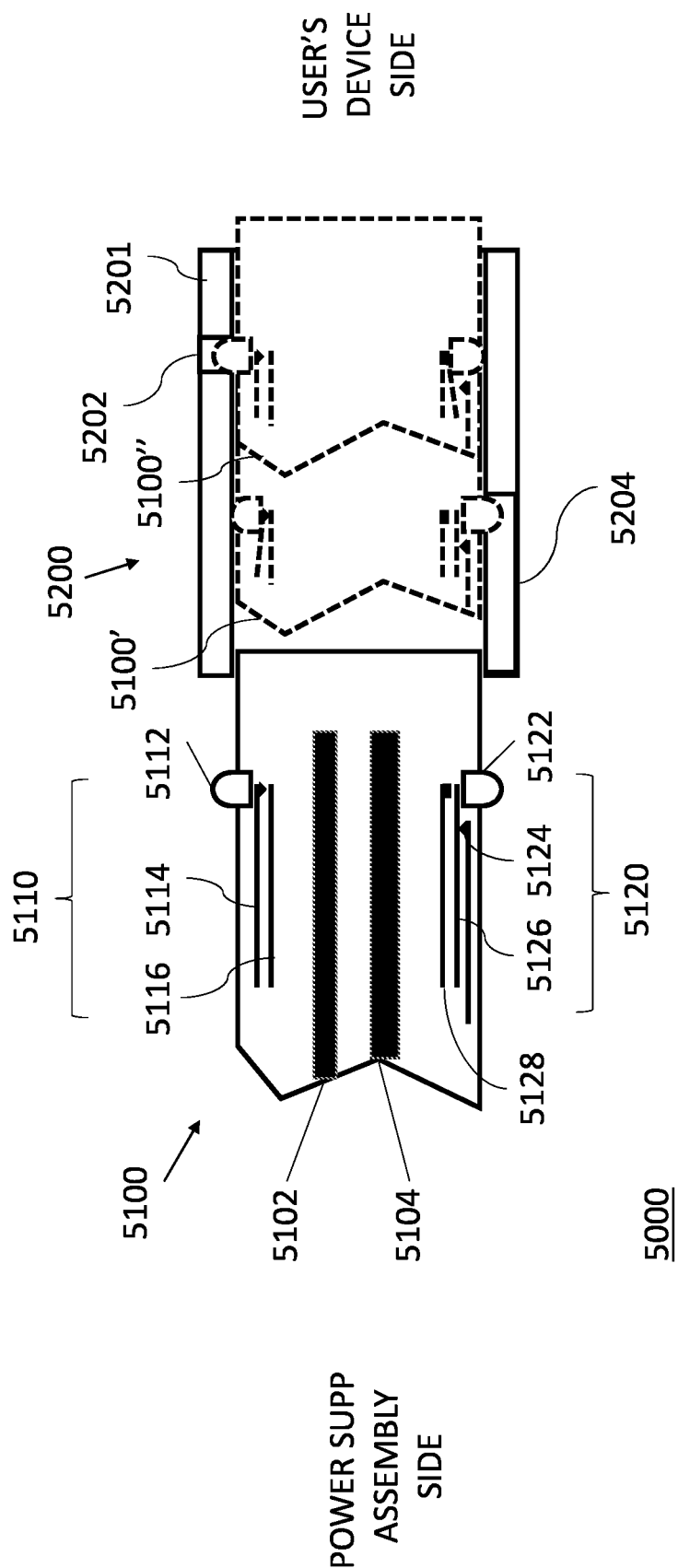
FIG. 5H is a partially schematic illustration of a connector, according to some embodiments of the present invention.

Reference is made now to FIG. 5H, which is a partial schematic illustration of connector 5000, according to some embodiments of the present invention. Connector 5000 demonstrate another embodiment for embedding a 'set' and an 'unset' switches in a connector adapted to connect the output of a power supply assembly, such as power supply assembly 300 or 400 to a user's device, so as to enable transferring the power supply assembly to a 'set' state when the connector is inserted to its matching socket and transferring the power supply assembly back to 'unset' state when the connector is withdrawn from its socket. Connector assembly 5000 comprises connector male part 5100 and connector female (or socket) part 5200. Connector male part 5100 comprises at least two power pins 5102 and 5104, a first switch arrangement 5110, and a second switch assembly 5120. First switch assembly may comprise springy leave contacts 5114 and 5116 that are disposed close to each other with a thin air gap between them. First switch assembly may further comprise first activation pin 5112 disposed so that it protrudes through the external envelope of male part 5100 and is configured to be pressed by an inner face of the female part 5200 when the male part 5100 is inserted into the female part 5200. When first activation pin is pressed it causes closing the gap between contacts 5114 and 5116.

Second switch assembly 5120 may comprise springy leave contacts 5124, 5126 and 5128 that are disposed close to each other, where an electrical connection exists between contacts 5124 and 5126 and a thin air gap exists between contacts 5126 and 5128. Second switch assembly may further comprise second activation pin 5122 disposed so that it protrudes through the external envelope of male part 5100 and is configured to be pressed by an inner face of the female part 5200 when the male part 5100 is inserted into the female part 5200.

Female part 5200 is made with at least one hole 5202 made through its external tubular envelope 5201 and one elongated slot 5204 made through its external tubular envelope 5201 and extending from the entry to female part 5200. Through slot 5204 is made so that second activation pin 5122 protrudes through it through the beginning of insertion of male part 5100 and until male part 5100 is positioned in a first insertion position 5100' and through hole 5202 is made so that first activation pin 5112 protrudes through it when male part 5100 is positioned in a second insertion position 5100". As is apparent from the positions 5100' and 5100" of male part 5100, at the first insertion position 5100' first pin 5112 is depressed and thereby makes contact between contact pins 5114 and 5116, and the second pin remains unpressed when traveling through slot 5204, thereby maintaining the states contacts 5124, 5126 and 5128 the same as in the fully withdrawn position. During the transition to the second insertion position 5100", initially first pin 5112 remains depressed while second pin 5122 is depressed, thereby inverting the states of its respective contacts and then first pin 5112 is released through hole 5202. while second pin 5122 remains depressed It would be apparent to those skilled in the art that the alternating states of first switch assembly 5100 and of second switch assembly 5120 may be used to change the state of a respective power supply assembly to 'set' state when the male part 5100 of connector 5000 is fully inserted into its female part 5200, and to change the state of the power supply assembly back to 'unset' state merely due to the respective changes in the states of switch assemblies 5110 and 5120. It would further be apparent to those skilled in the art that other switching assemblies may be used, which comply with the general operation requirement that causes a connecting action of the connector of the power supply assembly to change the state of the power supply assembly to 'set' state, and to turn its state to 'unset' when the male part of the connector is pulled apart from the female part.

In some embodiments, the initiation of the operation of the power connection control unit may be controlled from an external remote controller, and a receiver circuit, external to the power supply assembly.

In some embodiments, the source of energy for initially operating a user's device may be provided to a circuitry controlling that device from a remote controller that is configured to emit light energy upon a photovoltaic panel that may convert that energy to electrical power adapted to start the process of connecting a user's device to power source.

Figure 6A:
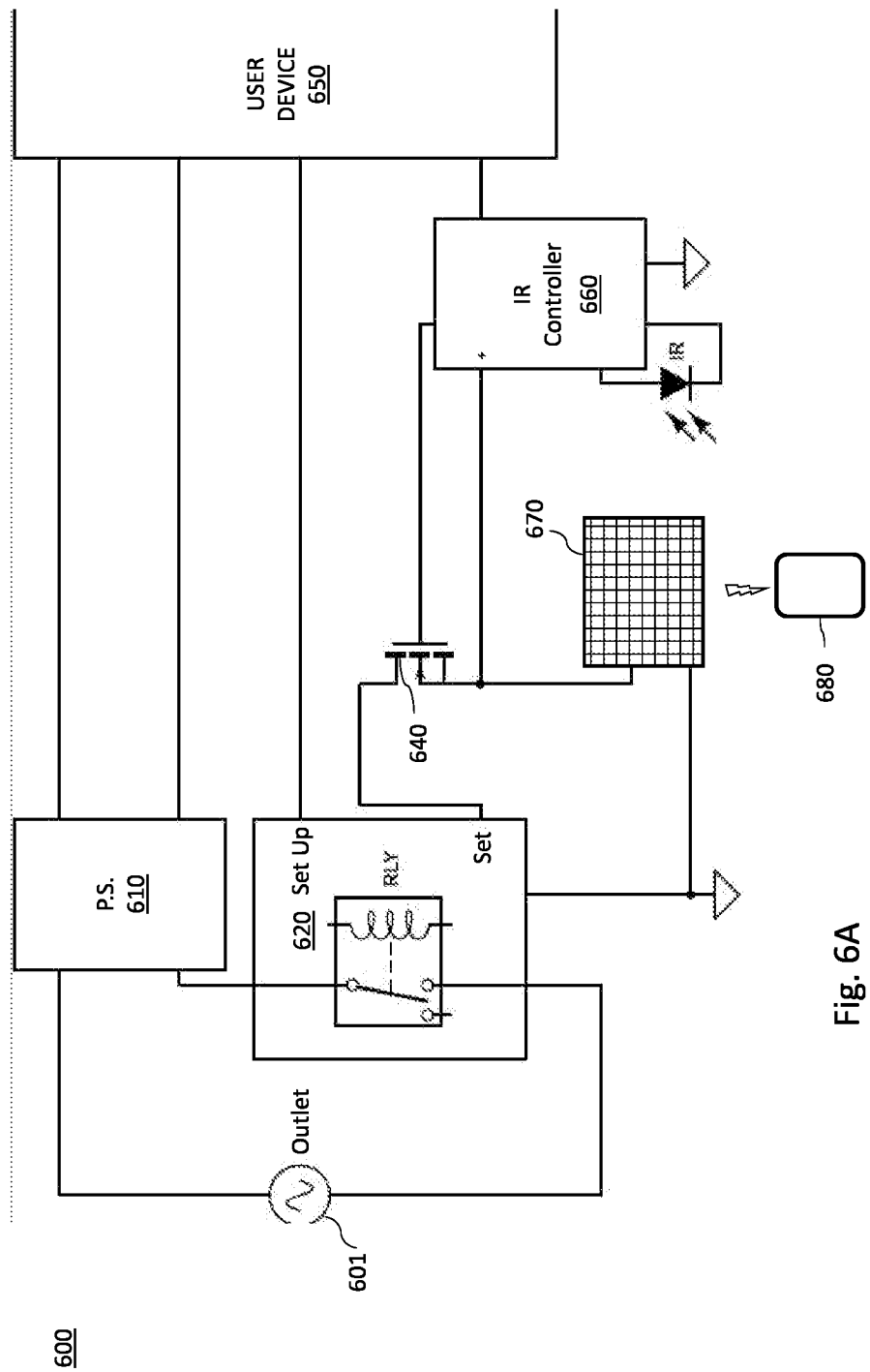
FIGS. 6A and 6B are schematic block diagrams of two exemplary embodiments for controlling the connection of a user's device to a power source using light energy, according to embodiments of the present invention.
Figure 6B:
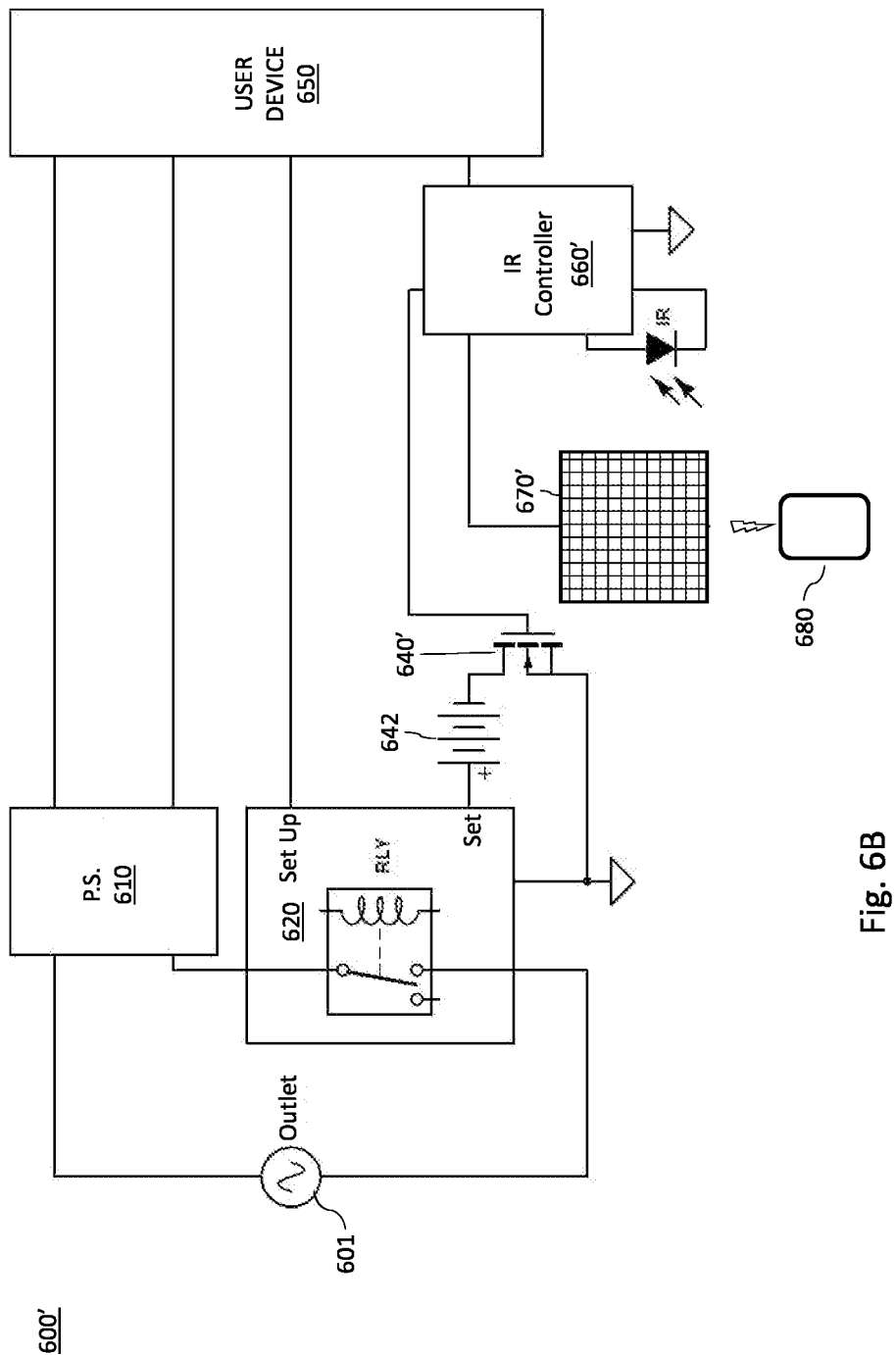

Reference is made now to FIGS. 6A and 6B, which are schematic block diagrams of two exemplary embodiments 600, 600' respectively, for controlling connection of a user's device to power source, for example, using light energy or any other form of energy such as a battery or any other small power supply, according to embodiments of the present invention. Assemblies 600, 600' comprise a power supply (PS) unit 610 adapted to convert AC mains input voltage, such AC voltage available at a house's wall AC socket, to DC voltage (or AC voltage in some cases) required to power (and/or charge and/or recharge) user's device 650. Assemblies 600, 600' further comprise power connection control device 620 configured to control the connecting or disconnecting of AC current to PS 610, in response to control signals provided to its SET input or to its unset input, e.g. similar to the operation of device 320 of FIG. 3. In order to completely disconnect user's device 650 and its power supply connection circuitry 610, 620 from any power source while the system is in disconnection state, the initial source of energy for changing the state of assembly 600 from 'disconnected' to 'connected' may be received from an external remote control unit 680 via IR controller 660 which controls switch 640. For example, remote control unit 680, is configured to send a signal to power connection control device 620 via IR controller 660, using any known wireless communication method, thereby controlling switch 640 to connect or disconnect the power from PS 610 to user's device 650. In some embodiments, IR controller 660, or other receiver type and/or switch 640 may be provided with a small power supply circuit, such as a 3V 0.5 W AC-DC power supply circuit or battery.

In a nonlimiting example, remote control unit 680, is configured to perform at least two functions, preferably concurrently. First, remote control unit 680 may be adapted to emit light energy upon photovoltaic panel 670 and second, remote control unit 680 may be adapted to emit light energy upon IR controller 660 and upon controller 660. The emission of light upon panel 670 may provide sufficient electrical energy for setting power control unit 620 to its 'set' state, while the emission of coded light signal upon controller 660 (which may be powered by electricity produced by panel 670) may cause providing the electrical power for providing the 'set' control signal to device 620, for example via a very low energy switch 640 (e.g. MOSFET transistor). According to this embodiment the entire assembly 600 stores no electrical energy while in its 'disconnected' state.

In another embodiment, as depicted in FIG. 6B, the light energy of remote control unit 680 may be used only for activating the IR controller 660' in order to enable it to provide 'set' signal to switch 640', while the energy for changing the state of device 620 to 'set' state may be received from an internal battery 642.

Both embodiments of FIGS. 6a and 6b are examples where even the very low power consumption associated in the 'wait' state of devices such a TV set, that are adapted to remain connected constantly to the mains, may be saved. Such power, when properly calculated, may sum to non-negligible amount when environment-attention is considered.

In other embodiments a similar configuration may be designed to power only the IR receiver circuit in a user's device, that is permanently connected to electrical power, and to further send a signal to the device's RC controller receiver. This may be done by connecting an output on the IR controller to the device's circuitry using only remote-control unit 680, photovoltaic panel 670 and IR controller 660. With this embodiment, devices that need to be continuously connected to the power supply or devices that run on batteries would still be able to at least save the energy wasted on 'waiting' for the IR signal.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A power supply assembly comprising:
   a local power source;
   a first switch connected to a second switch and the local power source; and
   the second switch, configured to connect and disconnect a power supply unit to and from an AC power source in response to a respective control signal,
   wherein the second switch is configured to maintain, both:
   (i) a set state at which the power supply unit is connected to the AC power source and (ii) an unset state at which the power supply unit is disconnected from the AC power source, and wherein maintaining both the set and unset states are without consuming electrical power from any one of the local power source and the AC power source,
   wherein the first switch is configured to maintain two states without consuming electrical power from any one of the local power sources and the AC power source, wherein the two states of the first switch are a set state, adapted to switch on the second switch and an unset state.

2. The power supply assembly of claim 1, further comprising the power supply unit, and wherein the power supply unit is adapted to provide power to a user's device.

3. The power supply assembly of claim 1, wherein the second switch comprises a latch relay controllable to be in set state in response to control signal provided to its set input terminal or in unset state in response to control signal provided to its set input terminal.

4. The power supply assembly of claim 1, wherein the respective control signal is a momentary electrical connection.

5. The power supply assembly of claim 4, wherein the momentary electrical connection need not be longer than 5 mS.

6. The power supply assembly of claim 1, wherein in order to change the state of the latch relay from unset to set or from set to unset the energy required to be provided to the set control terminal or to the unset control terminal need not be more than 250 µAh.

7. The power supply assembly of claim 1, wherein the power source for the set control signal and for the unset control signal is independent from the AC power source and from the output power of the power supply unit.

8. The power supply assembly of claim 7 wherein the power source for at least the set control signal is received from a user's device.

9. The power supply assembly of claim 8, wherein the power source for at least the set control signal is received from a battery disposed in the user's device.

10. The power supply assembly of claim 9, wherein the power source for the unset control signal is received from the power supply unit of the power supply assembly.

11. The power supply assembly of claim 1, wherein the second switch is operable by a low voltage and is configured to connect and disconnect AC power source of high voltage.

12. The power supply assembly of claim 1, wherein the local power source is a 3V DC power source and the AC controllable switch is configured to connect and disconnect an AC power source of 220V.

13. The power supply assembly of claim 1, further comprising an external remote control configured to send a signal to the first switch via a receiver circuit to connect or disconnect the AC power source.

14. The power supply assembly of claim 1, further comprising an external remote control, a receiver, and a controllable switch connected to the receiver, wherein the external remote control is configured to send a signal to the receiver in the power connection control device, which controls the first switch that connects or disconnects the AC power source.

15. The power supply assembly of claim 1, wherein the first switch is configured to connect and disconnect the second switch from the local power source.

16. The power supply assembly of claim 1, wherein the second switch is configured to maintain a connected state following a control signal from the first switch and maintain a disconnected state based on a signal from a user device.

* * * * *